United States Patent [19]
Takebayashi et al.

[11] Patent Number: 6,113,936
[45] Date of Patent: Sep. 5, 2000

[54] METHOD FOR MICROENCAPSULATING A SOLID SUBSTANCE

[75] Inventors: Yoshihiro Takebayashi, Toyonaka; Nobuhito Ueda, Ashiya; Shugo Nishi, Takarazuka, all of Japan

[73] Assignee: Sumitomo Chemical Company, Limited, Osaka, Japan

[21] Appl. No.: 09/310,866

[22] Filed: May 13, 1999

[30] Foreign Application Priority Data

May 18, 1998 [JP] Japan .................................. 10-135475

[51] Int. Cl.⁷ ......................... A01N 25/28; A01N 25/30; B01J 13/18
[52] U.S. Cl. ........................... 424/419; 424/408; 424/417
[58] Field of Search ..................... 424/408, 417, 424/419; 427/213.34

[56] References Cited

U.S. PATENT DOCUMENTS

| | | | |
|---|---|---|---|
| 4,428,983 | 1/1984 | Nehen et al. | 427/213.34 |
| 4,443,497 | 4/1984 | Samejima et al. | 427/213.36 |
| 4,557,755 | 12/1985 | Takahashi et al. | 504/116 |
| 5,160,529 | 11/1992 | Scher et al. | |
| 5,576,008 | 11/1996 | Yang et al. | 424/408 |
| 5,576,009 | 11/1996 | Nastke et al. | 424/408 |
| 5,733,561 | 3/1998 | Shimura et al. | 424/408 |
| 6,015,571 | 1/2000 | Scher et al. | 424/408 |

FOREIGN PATENT DOCUMENTS

| | | |
|---|---|---|
| 0 158 449 | 10/1985 | European Pat. Off. |
| WO 98 28975 | 7/1998 | WIPO |

*Primary Examiner*—Robert H. Harrison
*Attorney, Agent, or Firm*—Sughrue, Mion, Zinn, Macpeak & Seas, PLLC

[57] ABSTRACT

A microencapsulation method of a biologically active solid substance that is characterized by polymerizing a monomer that is polymerizable by condensation in a dispersion containing i) a solution containing a nonionic substance and ii) the biologically active solid substance that is insoluble or difficult to dissolve in said solution, wherein the nonionic substance is effective for dispersing the biologically active substance in said solution, is an effective method for producing a microencapsulated composition without aggregation.

9 Claims, No Drawings

METHOD FOR MICROENCAPSULATING A SOLID SUBSTANCE

FIELD OF THE INVENTION

The present invention relates to a microencapsulation method of biologically active substances that are solid at room temperature.

BACKGROUND OF THE INVENTION

Prior, when a solid substance is microencapsulated, the solid substance was dissolved with a solvent and then subjected to microencapsulation as a liquid core substance. However, the microencapsulation method has troublesome problems when the solid substance is insoluble or difficult to dissolve in available solvents. Namely, a specific solvent may be required or even if the microencapsulation can be successfully performed, a precipitation of the solid substance may cause to destroy the capsule walls.

On the other hand, as a microencapsulation method of biologically active solid substances, it is known that a pesticidal substance can be microencapsulated by the condensation-polymerization of methylolurea and/or methylolmelamine in the presence of both cationic urea resin and anionic surfactant (Japanese unexamined patent publications sho58-124705A and hei9-52805A). These methods comprise dispersing a core substance with an anionic surfactant or anionic dispersant and then forming resin wall at the surroundings of the core substance by the ionic binding force as melamine resin and urea resin have cation groups.

However these microencapsulation methods tend to cause an aggregation of core substance or microcapsules and it is difficult to obtain a uniform microencapsulated composition. And the microencapsulated compositions obtained by these methods also tend to aggregate by alterations in pH or in the presence of an ionic substance. Concerning pesticidal substances particularly, aggregating tendency depends on the hardness of the water utilized for diluting and there are problems of fluctuation of the effect of active ingredient and clogging at application.

SUMMARY OF THE INVENTION

The object of the present invention is to serve a microencapsulation method of biologically active substance being solid at room temperature that can be effectively carried out without aggregation.

The present invention is a microencapsulation method of biologically active solid substance and can be carried out by polymerizing a monomer that is polymerizable by condensation in a solution containing a nonionic substance.

In other words, the present inventions are a microencapsulation method of a biologically active substance being solid at room temperature that is characterized by polymerizing a monomer that is polymerizable by condensation in a dispersion containing i) a solution containing a nonionic substance and ii) the biologically active substance that is insoluble or difficult to dissolve in said solution, wherein the nonionic substance is effective for dispersing the biologically active substance in said solution.

DETAILED DESCRIPTION OF THE INVENTION

The biologically active substance being solid at room temperature (hereinafter, said solid substance) can be organic or inorganic substance and exemplified by medicines such as aspirin, tetracycline hydrochlorides, fluorouracils and insulin and pesticidal substances described later.

The average particle diameter of said solid substance which becomes core substance depends on the diameter of the desired microcapsule and usually 0.1 to 200 $\mu$m, preferably 0.5 to 100 $\mu$m. In case that the particle diameter of said solid substance is too large, it is preferable to pulverize said solid substance to make the average particle diameter within the designated range by dry pulverizing method or wet pulverizing method prior to microencapsulation. When the particle diameter of said solid substance is too small, it is preferable to recrystalize from a solution of said solid substance or to granulate said solid substance with a binder and then pulverize if necessary to make the average particle diameter within the designated range.

The form of said solid substance is not limited and undefined or polyhedric shaped solid substance, which most of the substances may be, can be effectively microencapsulated as well as spherical.

Pesticidal substances are exemplified by insecticides, fungicides, herbicides, repellents, chitin-synthesis inhibiters, insect growth regulators, plant growth regulators and so on.

Examples of the insecticides include pyrethroid compounds such as cyfluthrin, cypermethrin, deltamethrin, fenpropathrin, fenvalerate, esfenvalerate, tralomethrin, acrinathrin, bifenthrin, resmethrin and tetramethrin; carbamate compounds such as propoxur, isoprocarb, xylylcarb, metolcarb, XMC, carbaryl, pirimicarb, carbofuran, methomyl, fenoxycarb, alanycarb or metoxadiazone; organophosphorous compounds such as acephate, phenthoate, vamidothion, trichlorfon, monocrotophos, tetrachlorvinphos, dimethylvinphos, phosalone, chlorpyrifos, chlorpyrifos-methyl, pyridaphenthion, quinalphos, methidathion, methamidophos, dimethoate, fermothion, azinphos-ethyl, azinphos-methyl and salithion; urea compounds such as diflubenzuron, chlorfluazuron, lufenuron, hexaflumuron, flufenoxuron, flucycloxuron, cyromazine, diafenthiuron, hexythiazox, novaluron, teflubenzuron, triflumuron, 4-chloro-2-(2-chloro-2-methylpropyl)-5-(6-iodo-3-pyridylmethoxy)pyridazin-3(2H)-one, 1-(2,6-difluorobenzoyl)-3-[2-fluoro-4-(trifluoromethyl)phenyl]urea, 1-(2,6-difluorobenzoyl)-3-[2-fluoro-4-(1,1,2,3,3,3-hexafluoropropoxy)phenyl]urea, 2-tert-butylimino-3-isopropyl-5-phenyl-3,4,5,6-tetrahydro-2H-1,3,5-thiadiazon-4-one and 1-(2,6-difluorobenzoyl)-3-[2-fluoro-4-(1,1,2,2-tetrafluoroethoxy)phenyl]urea; chloronicotyl compounds such as acetamiprid, nitenpyram and diacloden; cartap; buprofezin; thiocyclam; bensultap; fenoxycarb; fenazaquin; fenpyroxymate; pyridaben; pyriproxyfen; hydramethylnon; thiodicarb; chlorfenapyr; fenpyroximate; pymetrozine; pyrimidifen; tebufenozide; tebufenpyrad; triazamate; indoxacarb; sulfluramid; milbemectin; avermectin; boric acid and paradichlorobenzene.

Examples of the fungicides include benzimidazole compounds such as benomyl, carbendazim, thiabendazole and thiophanate-methyl; phenylcarbamate compounds such as diethofencarb; dicarboxyimide compounds such as procymidone, iprodione and vinclozolin; azole compounds such as diniconazole, epoxyconazole, tebuconazole, difenoconazole, cyproconazole, flusilazole and triadimefon; acylalanine compounds such as metalaxyl; carboxyamide compounds such as furametpyr, mepronil, flutolanil and tolyfluanid; organophosphate compounds such as tolclofos-methyl, fosetyl aluminum and pyrazophos; anilinopyrimidine compounds such as pyrimethanil, mepanipyrim and cyprodinil; cyanopyrrrole compounds such as fludioxonil and fenpiclonil; antibiotics such as blasticidin-S, kasugamycin, polyoxin and validamycin; methoxyacrylate compounds such as azoxystrobin, kresoxim-methyl and metominostrobin; chlorothalonil; manzeb; captan; folpet; oxine-copper; basic copper chloride; tricyclazole; pyroquilon; probenazole; phthalide; cymoxanil; dimethomorph; S-methylbenzo[1,2,3]thiadiazol-7-carbothioate; famoxadone; oxolinic acid; fluaziname; ferimzone; chlobenthiazone; isovaledione; tetrachloroisophthalonitrile; thiophthalimideoxybisphenoxyarsine; 3-iodo-2-propylbutylcarbamate; silver zeolite; silica gel silver; phosphate zirconium silver chloride; parahydroxy benzoic ester; sodium dehydroacetate and potassium sorbate.

Examples of the herbicides include triazine compounds such as atrazine and metribuzin; urea compounds such as fluometuron and isoproturon; hydroxybenzonitrile compounds such as bromoxynil and ioxynil; 2,6-dinitroaniline compounds such as pendimethalin and trifluralin; aryloxyalkanoic acid compounds such as 2,4-D, dicamba, fluoroxypyr and mecoprop; sulfonylurea compounds such as bensulfuron-methyl, metsulfuron-methyl, nicosulfuron, primisulfuron and cyclosulfamuron; imidazolinone compounds such as imazapyr, imazaquin and imazethapyr; bispyribac-sodium; bisthiobac-sodium; acifluofen-sodium; sulfentrazone; paraquat; flumetsulam; triflusulfuron-methyl; fenoxaprop-P-ethyl; cyhalofop-butyl; diflufenican; norflurazone; isoxaflutole; glufosinate-ammonium; glyphosate; bentazon; benthiocarb; mefenacet; propanyl and flutiamide.

Examples of the plant growth regulators include maleic hydrazide, clormequat, ethephon, gibberellin, mepiquat chloride, thidiazuron, inabenfide, paclobutrazol and uniconazole.

Examples of the insect repellents include 1S, 3R, 4R, 6R-carane-3,4-diol and dipropyl 2,5-pyridine dicarboxylate.

Examples of the monomers utilized in the invention include melamine and formalin for melamine resin; phenol or cresol and formalin, acetaldehyde or glutaraldehyde for phenol resins; urea and formalin for urea resin; guanamine and formalin for guanamine resin; $\epsilon$-caprolactame for polyamide; polypepyide and formalin or glutaraldehyde for cross-linked polypepyide; and epichlorhydrin and bisphenol A for epoxy resin. In these monomers, melamine and formalin for melamine resin; phenol or cresol and formalin, acetaldehyde or glutaraldehyde for phenol resins; urea and formalin for urea resin; and guanamine and formalin for guanamine resin are preferably utilized.

As the solvent utilized for a solution containing a nonionic substance in the present invention, it should be inactive against said solid substances. Further, the solvent should be selected wherein said solid substance is insoluble or difficult to dissolve in the solvent. For example, water may be utilized as the solvent when said solid substance is water-insoluble or is difficult to dissolve in water and an organic solvent such as hydrocarbons may be utilized when said solid substance is insoluble or difficult to dissolve in said organic solvent like a protein. In the present invention, the phrase "insoluble or difficult to dissolve" means that a part of said solid substance can be exist as solid in the solvent. However, it is practically needed that the most of said solid substance exists as solid in the solvent, because the dissolved solid substance cannot be microencapsulated and an effectual microencapsulation is not performed in case that said solid substance is easy to dissolve in the solvent.

The following explanation is an example when said solid substance is water-insoluble or difficult to dissolve in water and water is used as a solvent.

At first, a dispersion comprising i) an aqueous solution containing a nonionic substance and ii) said solid substance that is insoluble or difficult to dissolve in said aqueous solution (hereinafter, the dispersion) is prepared.

The nonionic substances are exemplified by a substance having an ability of forming protective colloid, a substance having an ability as a surfactant and a mixture thereof. Examples of the substance having an ability of forming protective colloid include polyvinyl alcohols; cellulose ethers and esters such as hydroxypropylcellulose, hydroxypropylmethylcellulose, hydroxypropylmethylcellulose phthalate, methylceflulose and ethylcellulose; polyalkylene glycols such as polyethylene glycol and polypropylene glycol; polyvinylpyrrolidone; starch; and mixtures thereof. Examples of the substance having an ability as a surfactant include ethylene oxide additives of higher alcohols, ethylene oxide additives of alkylphenols, ethylene oxide additives of fatty acids, ethylene oxide additives of polyhydric alcohol esters of fatty acids, ethylene oxide additives of higher alkylamines, ethylene oxide additives of fatty amides, ethylene oxide additives of fats or fatty oils, ethylene oxide additives of polypropylene glycols, fatty acid esters of glycerin, fatty acid esters of pentaerythritol, fatty acid esters of sorbitol or sorbitan, fatty acid esters of sucrose, alkyl ethers of polyhydric alcohols, fatty acid amides of alkanolamines and mixtures thereof.

The dispersion is usually prepared by dispersing said solid substance in the aqueous solution of a nonionic substance and optionally adjusting a dispersed condition of said solid substance by a standard methods such as wet pulverizing and the like. And it is also prepared by dispersing said solid substance in water and then dissolving a nonionic substance in water.

The concentration of said solid substance in the dispersion is suitably set in view of the concentration of the desired microcapsules and is usually 0.01 to 50% by weight preferably 0.1 to 30% by weight.

The concentration of the nonionic substance in the dispersion depends on a concentration of said solid substance, a sort of the monomer used for condensation polymerization, a sort of the nonionic substance and so on, and is usually 0.001 to 10% by weight, preferably 0.005 to 5% by weight. The temperature in preparing the dispersion is usually 10 to 80° C., preferably 20 to 70° C.

In preparing the dispersion, the dispersion may be stirred usually for 5 minutes to 2 hours prior to condensation-polimerization of a monomer, if necessary for the purpose of adjusting a dispersed condition more uniformly.

The objective microencapsulated composition wherein said solid substance is covered with a polymer can be obtained by condensing and polymerizing the monomer corresponding to said polymer in the dispersion after preparing the dispersion.

The polymers obtainable by condensation and polymerization of the monomer include melamine resin; phenol resin; urea resin; amino resin such as aniline resin, aromatic sulfonamide resin, amino-s-triazine resin and so on; aromatic hydrocarbon resin such as aromatic hydrocarbon-formaldehyde resin, xylene-formaldehyde resin, toluene-formaldehyde resin, naphthalene-formaldehyde resin, acenaphthene-formaldehyde resin and so on; acetal resin; epoxy resin; alkyd resin; polyamide such as nylon 6, nylon 7, nylon 12, nylon 66, nylon 610 and so on; polyimide; aliphatic or aromatic polyester such as polyethyleneterephthalate-p-oxybenzoate, polylactic acid, polyglycol acid, poly $\gamma$ hydroxybutyric acid and so on; diarylphthalate resin; polycarbonate; polyurethane; polypeptide; polysaccharide; silicon-containing polymer such as organopolysiloxane and so on; phosphorus-containing polymer such as polyphosphonate, phoryl resin, polydiphenylvinylphosphine oxide, polyphosphonitrile chloride and so on. In the polymers, the resins that form three dimensional cross-linked structure by polymerization are preferable, and melamine resin and urea resin are more preferable.

Said solid substance is usually subjected to a reaction of the monomer polimerizable by condensation, after dispersed in an aqueous solution containing the nonionic substance. Therefore, the monomer polimerizable by condensation for forming a polymer is preferably one, which can be soluble in water, so called water-soluble monomer. The examples include methylolmelamine for melamine resin and urea and formalin for urea resin.

The added amount of the monomer polimerizable by condensation depends on the concentration of said solid substance, its surface area, its surface condition, the desired amount of the polymer and so on, and is usually 0.001 to 20 parts by weight, preferably 0.01 to 10 parts by weight based on one part by weight of said solid substance. In case of methylolmelamine that is a monomer for melamine resin, 0.01 to 7 parts by weight is preferable and 0.05 to 5 parts by weight is more preferable.

The polymerization reaction can be performed according to standard methods, for example, heating a monomer, mixing a monomer with another monomer and optionally heating them, adding a catalyst to a monomer(s), or the like. Further, the polymerization reaction may be performed after the pH value is adjusted by acetic acid, sulfuric acid or the like if necessary. For example, in polymerization of methylolmelamine that is a monomer for melamine resin, the pH range of from 2 to 7 is generally preferable and especially the pH range of from 3 to 6 is more preferable.

The temperature and time for polymerization depends on a sort of utilized monomer for condensation polymerization, said solid substance, the nonionic substance and so on, and the temperature is 20 to 90° C., preferably 30 to 80° C. and the time is usually 10 minutes to 24 hours, preferably 30 minutes to 12 hours.

To the obtained microencapsulated composition of said solid substance, the other components such as the other active ingredients, synergists, emulsifiers, wetting agents, thickners, stabilizers, pH adjusting agents, antifreezing agents, antiseptics, fungicides and so on can be optionally added. Further, solvents can be removed by usual method, if desired.

The microencapsulation of said solid substance that is insoluble or difficult to dissolve in water is mentioned above in case that the solvent is water. In case of microencapsulation of said solid substance that is insoluble or difficult to dissolve in organic solvents, the same procedure as the case of water solvent provided that utilizing organic solvent such as xylene in place of water as a solvent, nonionic surfactant as a nonionic substance and monomer that is soluble with organic solvents such as bisphenol A, pyridine and phosgene as a monomer polymerizable by condensation, can afford the objective microencapsulated composition.

The average particle diameter of the microcapsules of said solid substance obtainable above depends on the diameter of said solid substance and is usually 0.1 to 300 μm, preferably 0.5 to 200 μm.

The compositions of the present invention are applied by standard methods wherein the pesticidal compositions are utilized, according to the characteristics of the contained active ingredients. For example, in the case of a pesticidal active ingredient, the compositions may be applied by standard methods when an aqueous pesticidal formulation is utilized. In other words, according to the sort of the pesticidal active ingredients in the microcapsules, the microencapsulated composition may be used by itself or diluted in water, for controlling pests in water paddies and fields, weeds in water paddies and fields, termites in households or cockroaches indoors. For example, in the situation of soil treatment for the objective of controlling termites indoors, depending on the concentration of the active ingredient, usually from 1 to 5 liters per 1 $m^2$ is applied; in the situation of wood treatment, depending on the concentration of the active ingredient, usually from 50 to 400 mL per 1 $m^2$ is applied; and in the situation of indoor cockroach controlling, depending on the concentration of the active ingredient, usually from 10 to 100 mL is applied. Furthermore, in the situation of utilizng aerial dispersion formulations, usually from 0.8 to 40 L per hectare of the formulation is applied.

EXAMPLES

Hereinafter, the present invention is explained in detail with the examples.

Example 1

One gram of 1-naphthyl methylcarbamate (common name: carbaryl, volume average particle diameter 12.6 μm) was put in a metal container and 50 g of a 0.1% aqueous solution of HPC-M (hydroxypropylcellulose produced by Nippon Soda) was added. Furthermore, deionized water was added to make the total 80 g and then transferred to 40° C. water bath and was stirred for 1 hour at 150 rpm.

Separately, deionized water was added to 3.75 g of Sumitex-resin M-3 (80% aqueous solution of methylolmelamine produced by Sumitomo Chemical) to make the total 20 g. It was added to the above prepared carbaryl dispersion at 40° C. under stirring, adjusted the pH value 4.4 with acetic acid and then allowed to react at 40° C. for 2 hours to afford a microencapsulated composition containing 1% carbaryl.

Example 2

One gram of 1-naphthyl methylcarbamate (common name: carbaryl, volume average particle diameter 12.6 μm) was put in a metal container and 50 g of a 0.1% aqueous solution of Metolose SH-15 (methylcellulose produced by Shinetsu Chemical) was added. Furthermore, deionized water was added to make the total 80 g and then transferred to 40° C. water bath and was stirred for 1 hour at 150 rpm.

Separately, deionized water was added to 3.75 g of Sumitex-resin M-3 (80% aqueous solution of methylolmelamine produced by Sumitomo Chemical) to make the total 20 g. It was added to the above prepared carbaryl dispersion at 40° C. under stirring, adjusted the pH value 4.5 with acetic acid and then allowed to react at 40° C. for 2 hours to afford a microencapsulated composition containing 1% carbaryl.

Example 3

One gram of 1-naphthyl methylcarbamate (common name: carbaryl, volume average particle diameter 12.6 μm) was put in a metal container and 50 g of a 0.1% aqueous solution of Gohsenol GL-05 (polyvinyl alcohol produced by Nihon Gosei Chemical) was added. Furthermore, deionized water was added to make the total 80 g and then transferred to 40° C. water bath and was stirred for 1 hour at 150 rpm.

Separately, deionized water was added to 3.75 g of Sumitex-resin M-3 (80% aqueous solution of methylolmelamine produced by Sumitomo Chemical) to make the total 20 g. It was added to the above prepared carbaryl dispersion at 40° C. under stirring, adjusted the pH value 4.5 with acetic acid and then allowed to react at 40° C. for 2 hours to afford a microencapsulated composition containing 1% carbaryl.

Example 4

One gram of 1-naphthyl methylcarbamate (common name: carbaryl, volume average particle diameter 12.6 μm) was put in a metal container and 50 g of a 0.1% aqueous solution of Gohsenol GL,05 (polyvinyl alcohol produced by Nihon Gosei Chemical) was added. Furthermore, deionized water was added to make the total 80 g and then transferred to 40° C. water bath and was stirred for 1 hour at 150 rpm.

Separately, deionized water was added to 3.75 g of Sumitex-resin M-3 (80% aqueous solution of methylolmelamine produced by Sumitomo Chemical) to make the total 20 g. It was added to the above prepared carbaryl dispersion at 40° C. under stirring, adjusted the pH value 4.5 with acetic acid and then allowed to react at 40° C. for 2 hours to afford a microencapsulated composition containing 1% carbaryl.

Example 5

One gram of 1-naphthyl methylcarbamate (common name: carbaryl, volume average particle diameter 12.6 μm) was put in a metal container and 50 g of a 0.1% aqueous solution of polyvinyl alcohol 400 (Wako Chemical product, average molecular weight 400) was added. Furthermore, deionized water was added to make the total 80 g and then transferred to 40° C. water bath and was stirred for 1 hour at 150 rpm.

Separately, deionized water was added to 3.75 g of Sumitex-resin M-3 (80% aqueous solution of methylolmelamine produced by Sumitomo Chemical) to make the total 20 g. It was added to the above prepared carbaryl dispersion at 40° C. under stirring, adjusted the pH value 4.4 with acetic acid and then allowed to react at 40° C. for 2 hours to afford a microencapsulated composition containing 1% carbaryl.

Example 6

One gram of 1-naphthyl methylcarbamate (common name: carbaryl, volume average particle diameter 12.6 μm) was put in a metal container and 50 g of a 0.1% aqueous solution of polyvinyl alcohol 4000 (Wako Chemical product, average molecular weight 4000) was added. Furthermore, deionized water was added to make the total 80 g and then transferred to 40° C. water bath and was stirred for 1 hour at 150 rpm.

Separately, deionized water was added to 3.75 g of Sumitex-resin M-3 (80% aqueous solution of methylolmelamine produced by Sumitomo Chemical) to make the total 20 g. It was added to the above prepared carbaryl dispersion at 40° C. under stirring, adjusted the pH value 4.5 with acetic acid and then allowed to react at 40° C. for 2 hours to afford a microencapsulated composition containing 1% carbaryl.

Example 7

One gram of 1-naphthyl methylcarbamate (common name: carbaryl, volume average particle diameter 12.6 μm) was put in a metal container and 50 g of a 0.1% aqueous solution of Pepol B184 (polyoxyethylene(26) polyoxypropylene(30) glycol produced by Toho Chemical) was added. Furthermore, deionized water was added to make the total 80 g and then transferred to 40° C. water bath and was stirred for 1 hour at 150 rpm.

Separately, deionized water was added to 3.75 g of Sumitex-resin M-3 (80% aqueous solution of methylolmelamine produced by Sumitomo Chemical) to make the total 20 g. It was added to the above prepared carbaryl dispersion at 40° C. under stirring, adjusted the pH value 4.5 with acetic acid and then allowed to react at 40° C. for 2 hours to afford a microencapsulated composition containing 1% carbaryl.

Example 8

One gram of 1-naphthyl methylcarbamate (common name: carbaryl, volume average particle diameter 12.6 μm) was put in a metal container and 50 g of a 0.1% aqueous solution of Tween 20 (polyoxyethylene(20)sorbitan monolaurate produced by Wako Chemical) was added. Furthermore, deionized water was added to make the total 80 g and then transferred to 40° C. water bath and was stirred for 1 hour at 150 rpm.

Separately, deionized water was added to 3.75 g of Sumitex-resin M-3 (80% aqueous solution of methylolmelamine produced by Sumitomo Chemical) to make the total 20 g. It was added to the above prepared carbaryl dispersion at 40° C. under stirring, adjusted the pH value 4.5 with acetic acid and then allowed to react at 40° C. for 2 hours to afford a microencapsulated composition containing 1% carbaryl.

Example 9

One gram of 1-naphthyl methylcarbamate (common name: carbaryl, volume average particle diameter 12.6 μm) was put in a metal container and 50 g of a 0.1% aqueous solution of Nikkol TO-10 (polyoxyethylene(20) sorbitan monooleate produced by Nikko Chemicals) was added. Furthermore, deionized water was added to make the total 80 g and then transferred to 40° C. water bath and was stirred for 1 hour at 150 rpm.

Separately, deionized water was added to 3.75 g of Sumitex-resin M-3 (80% aqueous solution of methylolmelamine produced by Sumitomo Chemical) to make the total 20 g. It was added to the above prepared carbaryl dispersion at 40° C. under stirring, adjusted the pH value 4.5 with acetic acid and then allowed to react at 40° C. for 2 hours to afford a microencapsulated composition containing 1% carbaryl.

In the process of the above examples, an aggregation of active ingredient or microcapsules was not observed and uniform microencapsulated compositions of biologically active substance were produced.

What is claimed is:

1. A microencapsulation method of a biologically active solid substance which comprises polymerizing a monomer that is polymerizable by condensation in a dispersion containing i) a solution containing a nonionic substance and ii) the biologically active solid substance that is insoluble or difficult to dissolve in said solution, wherein the nonionic substance is effective for dispersing the biologically active substance in said solution.

2. A method according to claim 1, wherein the biologically active solid substance is a pesticidal substance.

3. A method according to claim 1, wherein the nonionic substance is a substance that forms a protective colloid.

4. A method according to claim 1, wherein the nonionic substance is at least one selected from the group consisting of polyvinyl alcohol, cellulose ethers and esters, polyalkylene glycols, polyvinylpyrrolidone and starch.

5. A method according to claim 1, wherein the nonionic substance is a substance that acts as a surfactant.

6. A method according to claim 3, wherein the solution containing a nonionic substance is an aqueous solution.

7. A method according to claim 5, wherein the solution containing a nonionic substance is an aqueous solution.

8. A method according to claim 6, wherein the monomer that is polymerizable by condensation is a monomer for a melamine resin or urea resin.

9. A method according to claim 7, wherein the monomer that is polymerizable by condensation is a monomer for a melamine resin or urea resin.

* * * * *